Figure 1:
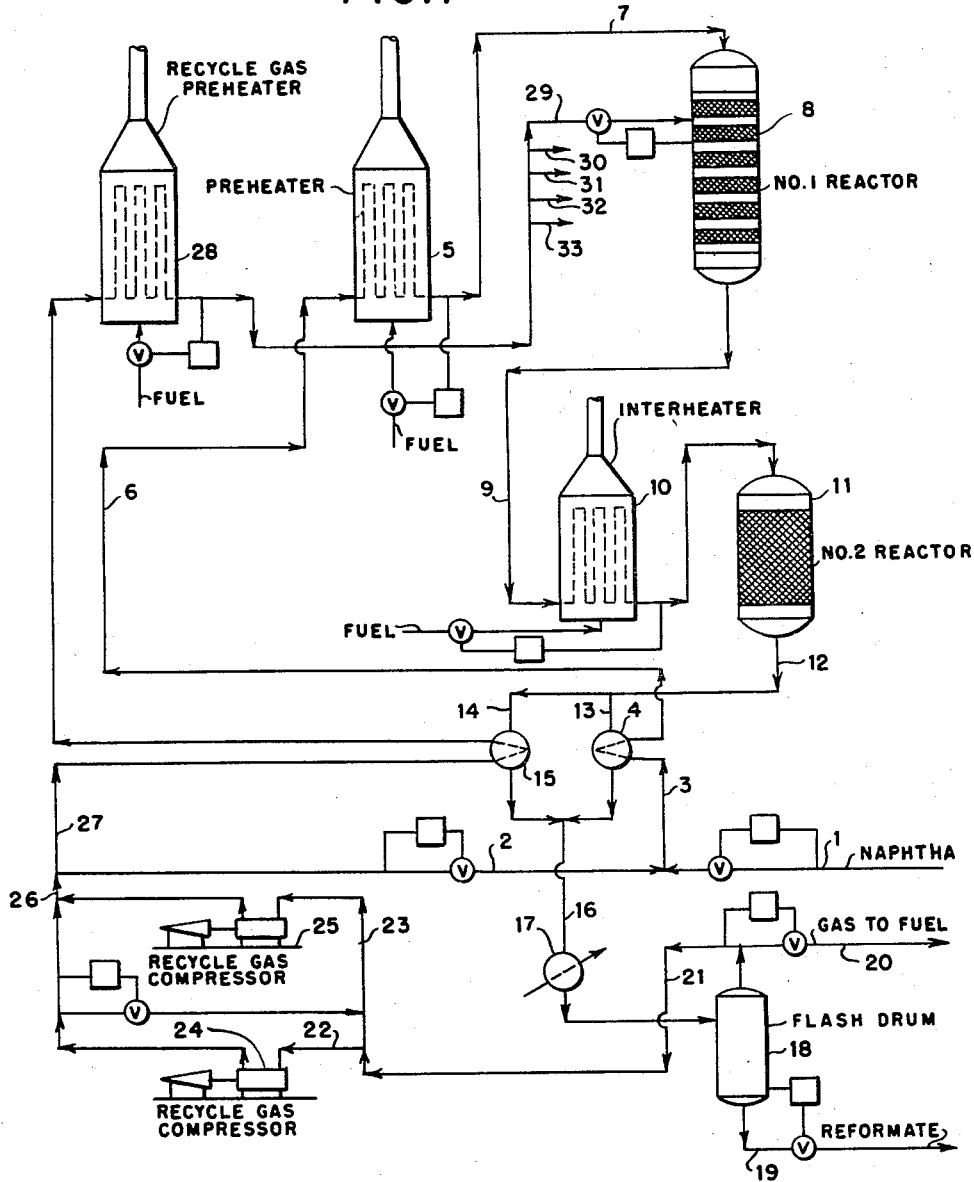

July 5, 1960 W. H. DECKER 2,943,998
CATALYTIC REFORMING OF STRAIGHT-RUN OR CRACKED NAPHTHA
FRACTIONS IN THE PRESENCE OF ADDED HYDROGEN
IN A MULTIPLE REACTOR FIXED-BED SYSTEM
Filed Aug. 27, 1956
4 Sheets-Sheet 2

William H. Decker
INVENTOR.

BY Adams, Forward & McLean

ATTORNEYS

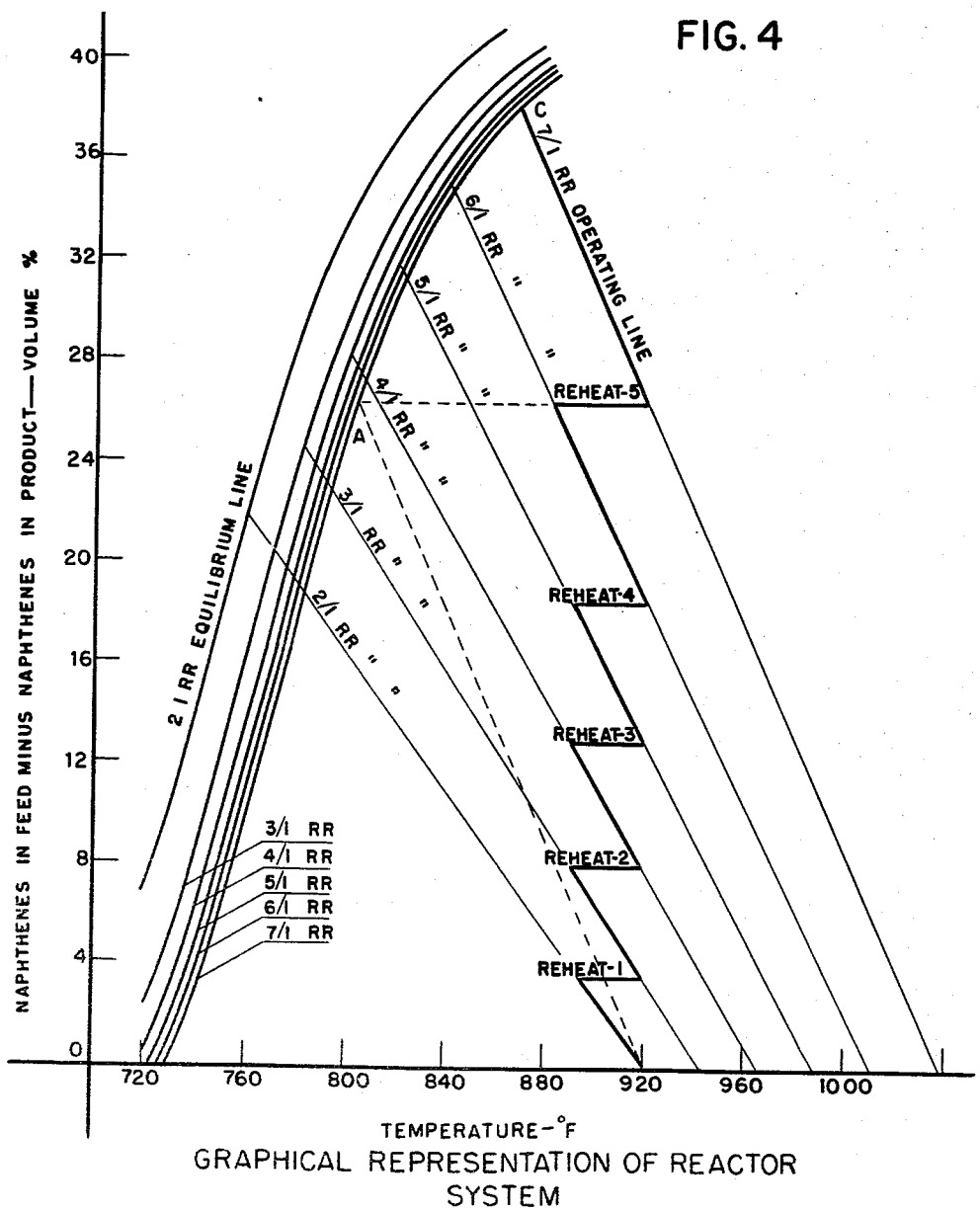

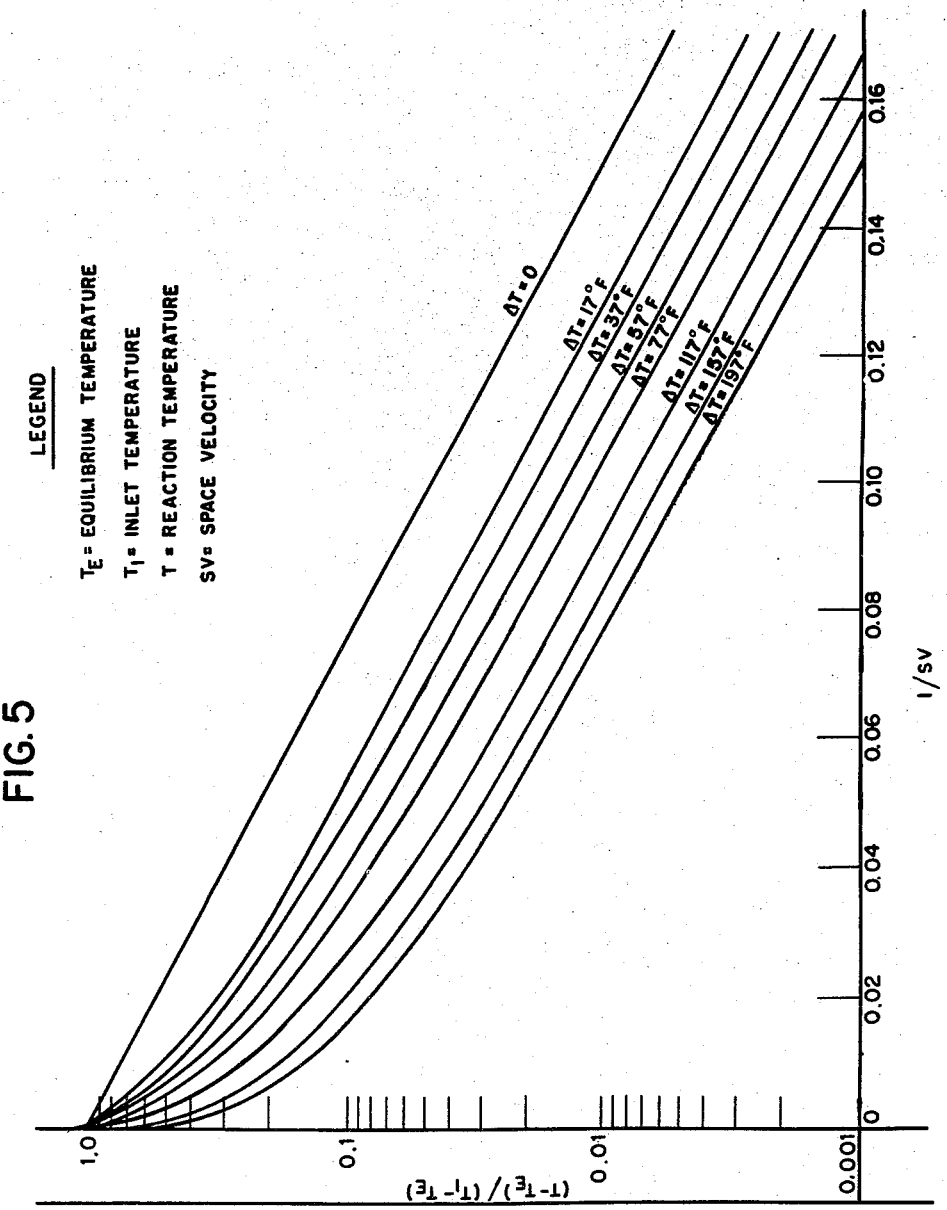

2,943,998
CATALYTIC REFORMING OF STRAIGHT-RUN OR CRACKED NAPHTHA FRACTIONS IN THE PRESENCE OF ADDED HYDROGEN IN A MULTIPLE REACTOR FIXED-BED SYSTEM

William H. Decker, Hazel Crest, Ill., assignor to Sinclair Refining Company, New York, N.Y., a corporation of Maine Filed Aug. 27, 1956, Ser. No. 606,286

1 Claim. (Cl. 208—65)

This invention relates to catalytic reforming of gasoline boiling range hydrocarbons and more particularly to the catalytic reforming of straight-run or cracked naphtha fractions in the presence of added hydrogen in a multiple reactor fixed-bed system.

The present day catalytic reforming process is employed to upgrade low octane straight-run or cracked naphthas to high octane fractions boiling in the gasoline range. A number of catalyst types are used for this conversion with the most common being of the platinum-on-alumina type. Conventional catalytic reforming units make use of three or more fixed-bed adiabatic reactors with interheating between reactors in order to maintain reaction temperatures. The basis for this general design lies in the nature of the reaction system involved in naphtha reforming. The primary catalytic reactions are predominantly endothermic and are characterized by extremely high reaction rates. Correspondingly the system temperatures fall very rapidly and it becomes necessary to employ interheating throughout the system in order to maintain the desired reaction temperature conditions.

For example, the temperature profile curves plotted as catalyst bed temperature versus catalyst bed inventory for a typical fixed-bed adiabatic three reactor system indicate drops in catalyst bed temperature of the order of 100°–120° F. for the first reactor, 40°–60° F. for the second reactor and 20°–25° F. for the third reactor. The first two reactors have undesirable temperature profiles because of the rapid loss in reaction temperature. The third reactor operates almost isothermally and can therefore be considered satisfactory. This loss in system temperature for the first two reactors gives rise to two undesirable conditions: (1) poor utilization of catalyst in the first reactors; and (2) unequal aging of catalyst since aging proceeds exponentially with temperature i.e., the higher the temperature the more rapid the rate of aging. The poor utilization of catalyst requires larger catalyst inventories and in view of the high costs of platinum type catalysts, this becomes a major factor in design. The inequalities in the aging rates of the catalyst in adiabatic reactors is of considerable importance because of its effect on the naphtha processing cycle. With the third reactor in a three reactor adiabatic system operating at the highest temperature, the catalyst in this reactor will age most rapidly and therefore will fix the length of the operating cycle. Since the processing cycle will be completed before the catalyst in the first two reactors has aged to an equivalent degree, this catalyst will not be fully utilized.

In contrast to such a fixed-bed adiabatic three reactor system, a system which operated isothermally would not suffer from these undesirable conditions. Although a truly isothermal reactor system would in general not be practical, any approximation to the isothermal system would be desirable. I have now devised a multiple reactor fixed-bed system which approaches isothermal operation, the first reactor of which replaces the first two reactors of a conventional three or more reactor adiabatic system with a consequent reduction in capital requirement for the reactor units and for catalyst inventory. The reforming process of my invention thus involves basically the maintenance of semi-isothermal temperature conditions in the first reactor of a multiple reactor fixed-bed system by limiting the amount of hydrogen-containing gas in admixture with hydrocarbon vapors initially charged to the first reactor catalyst bed and separately introducing additional pre-heated hydrogen-containing gas along the path of hydrocarbon flow through the first reactor catalyst bed in a particular manner. According to my invention a mixture of hydrogen-containing gas and hydrocarbon material in a molar ratio of at least 2:1, preferably 2 to 4:1, and at a temperature of 900° to 975° F. is charged to a catalyst bed in the first fixed-bed reactor of a multiple reactor fixed-bed system. Additional hydrogen-containing gas at a temperature of 1000° to 1400° F. is separately introduced into the first reactor at a plurality of points along the path of hydrocarbon flow through the bed. The pre-heated hydrogen-containing gas is intimately admixed at each point of introduction with the partially reacted hydrocarbon material passing that point. The pre-heated hydrogen-containing gas is introduced at each point along the path of hydrocarbon flow in sufficient quantity and is admixed with the partially reacted hydrocarbon material passing that point in such a manner that the temperature at any point along the path of hydrocarbon flow within the catalyst bed is maintained within about 10°–70° F. of the hydrocarbon material inlet temperature and such that the effluent gas from the first reactor contains a final molar ratio of hydrogen-containing gas to hydrocarbon material of about 5 to 15:1, preferably 5 to 10:1. The total effluent from the first reactor is withdrawn at a temperature of 850° to 925° F., reheated to a temperature of 900° to 975° F., and introduced into a catalyst bed in a subsequent fixed-bed reactor. The effluent from the subsequent reactor is withdrawn at a temperature of 880° to 960° F. It can be reheated and further reacted or it can be separated into a reformate stream and a hydrogen-containing gas stream. A portion of the hydrogen-containing gas stream is recycled to the first reactor.

My invention is more fully described with reference to Figure 1. Naphtha charge entering line 1 is mixed with a portion of the cold hydrogen-rich recycle gas stream from line 2 in line 3 and pre-heated to 700° to 800° F. in exchanger 4 with a portion of the effluent from second reactor 11 passing to exchanger 4 through lines 12 and 13. The hot naphtha-gas mixture is passed by means of line 6 to preheating furnace 5 wherein the temperature is raised to between 900° and 975° F. From furnace 5 the high temperature mixture is passed by means of line 7 to first reactor 8 equipped with a plurality of reheated zones. The effluent from reactor 8 leaves by means of line 9 at about 850° to 925° F. and is passed to interheating furnace 10 wherein the temperature is raised to about 900° to 975° F. The effluent is then passed down-flow through second reactor 11, and the second reactor effluent is withdrawn by means of line 12 at a temperature of about 880° to 960° F. The effluent in line 12 is divided into two portions passing respectively through exchangers 4 and 15 by means of lines 13 and 14 which are recombined in line 16 and passed through cooler 17 to flash drum 18 maintained at atmospheric temperature. Flash drum 18 separates the effluent into a gas and liquid stream which latter is withdrawn by means of line 19 and passed to a fractionating column (not shown) for stabilization. Hydrogen-rich gas passing overhead from flash drum 18 is divided into a net-gas make portion passing through line 20 and a recycle portion passing through line 21. The recycle gas portion passing through line 21 is divided and passed by means of lines 22 and 23 through gas compressors 24 and 25 prior to being recombined in line 26. The compressed recycle gas passing through line 26 is divided into a portion which is passed through line 2 and combined with the charge naphtha as described above and a separate portion which is passed by line 27 through exchanger 15 wherein it is preheated to 750° to 800° F. prior to introduction into preheated 28 wherein the temperature is raised to 1000° to 1400° F. The hot gas from furnace 28 is passed by means of lines 29, 30, 31, 32 and 33 to first reactor 8. Each of lines 29, 30, 31, 32 and 33 is provided with a separate temperature control system so that the amount of heating can be directly regulated.

Figure 2:
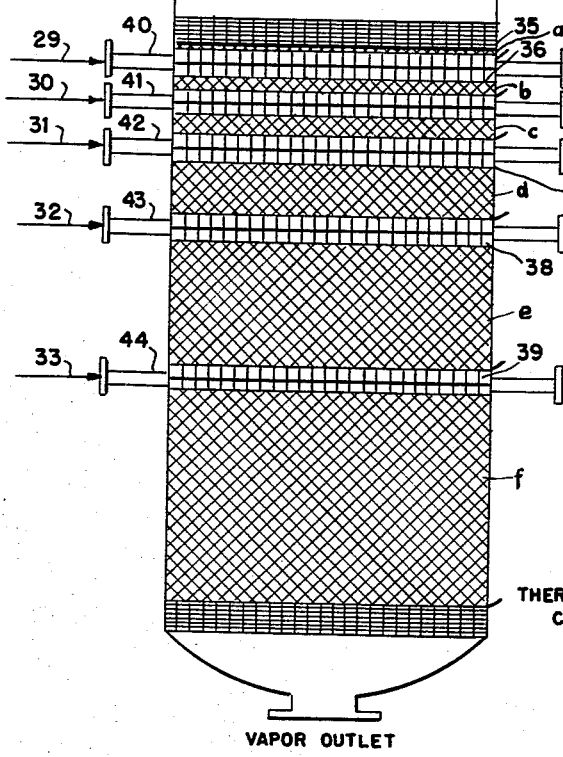
Figure 3:
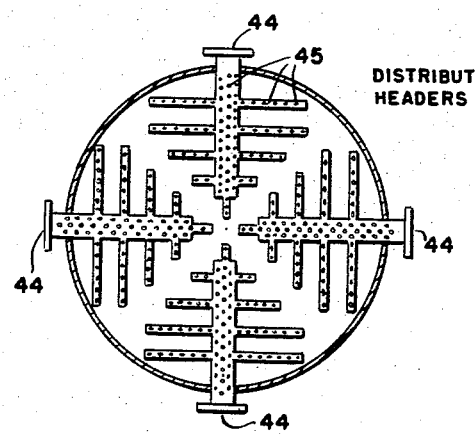

The general features of the design of first-reactor 8 are shown in Figures 2 and 3. This reactor is divided into 6 catalytic zones, $a$, $b$, $c$, $d$, $e$ and $f$, each zone being separated by means of gas distribution sections 35, 36, 37, 38 and 39. These gas distribution sections can be composed of some catalytically inert material such as alumina spheres, granular Alundum, or the like. Situated in the respective sections 35–39 are distribution headers 40, 41, 42, 43 and 44 provided with a large number of perforations 45 shown in detail in Figure 3.

The hot naphtha-gas mixture from line 7 enters reactor 8, is passed down-flow through the upper catalyst retention zone into the top catalyst zone $a$. The partially reacted naphtha and recycle gas leave this first catalyst zone and flow into first reheat distribution section 35 wherein the naphtha-gas stream is intimately mixed with the high temperature recycle gas entering through line 29 and header 40. The reheated gas mixture is then passed into catalyst zone $b$ for the further reaction and the reheating is repeated in each of sections 36 to 39. The amount of reheating gas introduced into each of sections 35–39 is regulated by means of a control valve located in the corresponding incoming gas line 29–33 which valve is responsive to a temperature controller maintaining the exit temperature from the catalyst zone involved. Thus the degree of reheat for each zone can be readily adjusted.

In Figure 2, five reheat sections have been shown and the amount of catalyst required for each zone is shown substantially in a proportion which gives satisfactory operation. The increase in the amount of catalyst required after each reheat section is the result of the lowered reaction rate as the reaction proceeds toward equilibrium. The number and arrangement of the catalyst zones and reheat sections, however, can be varied to suit any particular naphtha type or temperature profile required. Also the reactor shown in Figure 2 is subject to many other design arrangements such as variations in the design features of the catalyst beds. For example, a cross-flow or annular type reactor can be used. Variations in the manner by which the reheat mixing is achieved can also be made.

The process of my invention is further illustrated by the following operation in which reference is made to Figures 1 and 2.

417 barrels per hour of a typical Mid-Continent naphtha together with 1820 mols per hour of recycle gas containing about 70 volumes percent hydrogen at 920° F. from furnace 5 is passed by means of line 7 to cylindrical reactor 8 at an inlet pressure of 500 p.s.i.g. The catalyst inventory in reactor 8, which comprises a conventional pelleted platinum on alumina catalyst, is divided as follows:

| | Pounds |
|---|---|
| Zone $a$ | 50 |
| Zone $b$ | 110 |
| Zone $c$ | 155 |
| Zone $d$ | 210 |
| Zone $e$ | 500 |
| Zone $f$ | 11,800 |

Additional recycle gas from furnace 28 at 1140° F. is passed by means of lines 29, 30, 31, 32 and 33, into distribution headers 40, 41, 42, 43 and 44 respectively in the following amounts: 2740 mols/hr.; 3650 mols/hr.; 4560 mols/hr.; 5500 mols/hr.; and 6400 mols/hr. The vapor exit temperatures from catalyst zones $a$ through $f$ are respectively 894° F.; 891° F.; 891° F.; 891° F.; 882° F.; and 868° F.

A reformate sample is separated from the effluent from reactor 8 and has an octane number of 92 RON (clear).

The effluent from reactor 8 at a temperature of 868° F. is passed by means of line 9 to interheating furnace 10 wherein the temperature is raised to 920° F. It is introduced into reactor 11 at an inlet pressure of 500 p.s.i.g. Reactor 11 is cylindrical and contains 18,500 pounds of catalyst. Effluent from reactor 11 is withdrawn at 901° F.

Reformate is separated from the effluent in 82% yield of $C_5+$ and has an octane number of 95 RON (clear).

For a conventional adiabatic system involving 3 equal sized reactors operating with equal inlet temperatures and with an overall space velocity of 2.0 WHSV, the catalyst inventory in each reactor is about 18,500 pounds. Since the highest average bed temperature obtains in the third reactor, and since catalyst aging is a function of temperature, it is the third reactor that fixes the naphtha processing cycle time (before regeneration or replacement) and under such conditions the catalyst in the first two reactor beds has not been effectively utilized. Although the operation of second reactor 11 in the above illustration is essentially the same as the operation of the third reactor in a conventional adiabatic system, as can be seen from the above illustrative operation, the process of my invention affords significant savings in catalyst inventory and provides more effective utilization of a larger proportion of the catalyst inventory. For example, in the illustrative operation two catalyst vessels containing 37,000 pounds of catalyst are replaced by one vessel containing 12,825 pounds of catalyst.

Certain reactor conditions in the process of my invention can, of course, be varied. For example, the reactor pressure can range from about 25 to about 1000 p.s.i.g. and the weight hourly space velocity can range from about 0.25 to 10.0. Also the proportion of hydrogen in the recycle gas can range from about 35% to about 95% by volume.

A determination of the proportions of hot hydrogen containing recycle gas separately introduced into the first or semi-isothermal reactor and the proportions of catalyst in each of the catalyst zones in the semi-isothermal reactor can be conveniently made by reference to Figures 4 and 5 and to the calculations appearing below from which they are derived.

First a heat balance is developed relating the heat quantities involved for the recycle gas and naphtha feed streams and the primary system reaction, that of dehydrogenation of naphthenes to aromatics. From such a heat balance study, it is possible to relate reaction temperatures to the degree of reaction shown by the relationship:

One mole naphthene→one mole aromatics (1)
+3 moles hydrogen

This relationship can also be represented by the general equation for the equilibrium constant of the above expression:

$$K' = P_a(P_{h_2})^3 / P_n \qquad (2)$$

in which
$K'$ = equilibrium constant
$P_n$ = partial pressure of naphthenes in system
$P_a$ = partial pressure of aromatics in system
$(P_{h_2})^3$ = partial pressure of hydrogen in system Equation 2 can also be rewritten in terms of the percentages of naphthenes-aromatics and total system pressure:

$$K' = [(\text{percent A})/(\text{percent N})] \times (\text{partial pressure of hydrogen})^3 \quad (3)$$

This equation indicates that the ratio of aromatics to naphthenes is a function of the partial pressure of the hydrogen present. It is, therefore, possible to develop a series of relationships between reaction temperature and the aromatic-naphthene ratio and various partial pressures of hydrogen. These relationships are plotted in Figure 4 as the change in naphthene content (naphthenes in feed minus naphthenes in product) versus reaction temperature. For convenience, the hydrogen partial pressure parameters have been termed recycle gas ratios, i.e., 2/1–3/1, etc.

The conversion of naphthenes to aromatics can be shown by a heat balance to be represented by the relationship $$\Delta T = C \Delta N \quad (4)$$

in which $\Delta N$ = change in naphthene content (feed minus product)
$\Delta T$ = change in temperature
$C$ = constant where the constant C is a function of the quantity of recycle gas (e.g., partial pressure of hydrogen). With such a relationship a series of operating lines for various recycle ratios can be plotted as shown in Figure 4. These operating lines have an origin based upon a heat balance. Therefore, if a fixed quantity of heat is added to a fixed quantity of recycle gas, this is equivalent to increasing the temperature of the inlet feed system (naphtha plus recycle gas). For illustration, it is assumed that normal operation would be represented by a gas recycle ratio of 7.0 mols of gas per mol of naphtha and that the semi-isothermal system would be represented by operation with multiple reheat steps. Thus the initial operation would be at a 920° F. inlet temperature with a recycle ratio of 2/1 mols per mol, and each subsequent step would be with an additional unit of recycle gas as shown. By fixing the temperature of the recycle gas, each subsequent operating line can be located. It will be noted that each of these operating lines terminates on a different equilibrium line.

This graphical representation of the reaction system thus allows for a ready evaluation of the stages of reheat. For the case shown in Figure 4, the reaction is initiated at a temperature of 920° F. and proceeds along the 2/1 recycle ratio operating line to a temperature of 894° F. at which point the first reheat is used to raise the system reaction temperature to 920° F. The reaction then proceeds along the 3/1 recycle ratio operating line to a temperature of 891° F. at which time the second reheat is started. These steps are tabulated below:

Table I

| Reheat Stage | Recycle Ratio, Mols gas/Mol Feed | Temperature Inlet, °F. | Temperature Outlet, °F. |
|---|---|---|---|
| Initial Operation | 2/1 | 920 | 894 |
| 1 | 3/1 | 920 | 891 |
| 2 | 4/1 | 920 | 891 |
| 3 | 5/1 | 920 | 891 |
| 4 | 6/1 | 920 | 882 |
| 5 | 7/1 | 920 | 868 |

The graphical representation of conventional adiabatic operation is shown by a dotted line on Figure 4 with the initial operation at a temperature of 920° F. and a recycle ratio of 7/1. This is allowed to proceed to a temperature of 803° F. (A) which is the outlet of the No. 1 reactor; at this point the reaction products are reheated to 920° F. (B) with the interheater and the reaction allowed to proceed to a temperature of 870° F. (C), the outlet of the No. 2 reactor.

It is evident that the system chosen represents the replacement of the first two conventional adiabatic reactors by one equivalent semi-isothermal reactor. It is, however, apparent that there are a limitless number of combinations of reheat spaces, temperature combinations and recycle ratios that could be chosen.

Having once fixed the reaction system, it is necessary to determine the amount of catalyst needed in each of the reheat stages above. This is done by means of Figure 5 which is a plot of the reciprocal space velocity with an expression relating inlet and equilibrium temperatures with the temperature at any point in the system.

The amount of catalyst calculated for each of the several reheat stages is based upon the amount of catalyst required for a comparable adiabatic system. However, since each of the reheat stages is operating with different conditons of equilibrium temperature and exit temperature for the reheat stage under consideration (when compared with the comparable adiabatic system), it is necessary to make a suitable adjustment in the catalyst requirement to reflect these new temperature conditions. This adjustment is made by means of the following relationship:

$$K = e^{-\Delta E / RT} \quad (5)$$

This can be simplified—

$$\frac{d \ln K}{dT} = \Delta E / RT^2 \quad (6)$$

Assuming $\Delta E$ constant—

$$\ln \frac{K_{T_2}}{K_{T_1}} = \frac{\Delta E}{R}\left(\frac{1}{T_1} - \frac{1}{T_2}\right) \quad (7)$$

If $K_{T_1} = 1$ at a fixed temperature (example = 920° F.)

$$\ln K_{T_2} = \frac{\Delta E}{R}\left(\frac{1}{T_1} - \frac{1}{T_2}\right) \quad (8)$$

or $$K_{T_2} = e^{-\frac{\Delta E}{R}\left(\frac{1}{T_1} - \frac{1}{T_2}\right)} \quad (9)$$

in which $T_1$ = temperature at inlet
$T$ = temperature at any point in system
$T_E$ = temperature at equilibrium condition
$SV$ = space velocity at inlet
$SV^1$ = space velocity at any point in system
$K$ = rate constant
$\Delta E$ = energy of activation 18,000 B.t.u./lb. mol.
$R$ = gas constant
$T$ = temperature, ° R.
$W_O$ = weight of oil in pounds per hour
$W_C$ = weight of catalyst in reaction system Substituting the inlet and equilibrium temperatures for the various reheat stages, values of the rate constants are calculated for each reheat stage. These values are then used to adjust the space velocity requirements to the new conditions.

The development and application of this procedure involves several assumptions which should be considered.

(1) For simplification, the reaction system used for the first two reactors considers only the predominating naphthene dehydrogenation reactions. There are other reactions involved to a lesser extent, however, but these have been neglected. Possible errors from this source are not of significance, although for exact cases consideration should be given to such reactions.

(2) The heat balances used have been based upon the assumption of constant reactor product distribution at all points in the system. Actually, however, the product distribution is subject to continual change as the reaction proceeds through the catalyst bed. This assumption introduces an error of only small magnitude and can, therefore, normally be neglected.

(3) The determination of the amount of catalyst required in each of the reheat stages (see Figure 4) is based upon the assumption of perfect mixing in each of the reheat zones. Since perfect mixing and subsequent vapor distribution is difficult to insure, it is probable that a small amount of additonal catalyst would be required in each zone to insure the degree of reaction shown.

(4) In the outlet zone of the semi-isothermal reactor, the system is approaching the equilibrium conditions and, consequently, an infinite amount of catalyst would be required. Practically, the catalyst inventory in this zone is limited to a reasonable quantity, i.e., substantially equivalent to a 3–5 degree approach to the exit equilibrium temperature.

I claim:

A method for the catalytic reforming of a gasoline boiling range hydrocarbon material under semi-isothermal temperature conditions in a multiple reactor fixed-bed system which comprises charging a mixture of hydrogen-containing gas and hydrocarbon material in a molar ratio of at least 2:1 and at a temperature of 900° to 975° F. to a first fixed-bed reactor having a plurality of catalyst zones containing platinum-on-alumina type reforming catalyst, said zones in the course of the hydrocarbon flow containing a progressively larger amount of catalyst separately introducing additional hydrogen-containing gas at a temperature of 1000° to 1400° F. into the first reactor at a plurality of points along the path of hydrocarbon flow through the bed, intimately admixing the pre-heated hydrogen-containing gas at each point of introduction with the partially reacted hydrocarbon material passing that point, the pre-heated hydrogen-containing gas being introduced at each point along the path of hydrocarbon flow in progressively increasing quantities and being admixed in such a manner that the temperature at any point along the path of hydrocarbon flow within the catalyst bed is maintained within about 10°–70° F. of the hydrocarbon material inlet temperature and such that the effluent gas from the first reactor contains a final molar ratio of hydrogen-containing gas to hydrocarbon material of about 5–15:1, withdrawing the total effluent from the first reactor at a temperature of 850° to 925° F., reheating the effluent from the first reactor to a temperature of 900° to 975° F., introducing the first reactor effluent to a catalyst bed in a subsequent fixed-bed reactor, and withdrawing the effluent from the subsequent reactor at a temperature of 880° to 960° F.

References Cited in the file of this patent

UNITED STATES PATENTS

| | | |
|---|---|---|
| 2,330,069 | Marshall | Sept. 21, 1943 |
| 2,349,045 | Layng et al. | May 16, 1944 |
| 2,418,534 | Watson | Apr. 8, 1947 |
| 2,439,934 | Johnson et al. | Apr. 20, 1948 |
| 2,759,876 | Teter et al. | Aug. 21, 1956 |
| 2,781,298 | Haensel et al. | Feb. 12, 1957 |